(12) United States Patent
Gibberd

(10) Patent No.: US 8,845,235 B2
(45) Date of Patent: Sep. 30, 2014

(54) INSTALLATION OF UNDERWATER GROUND ANCHORAGES

(75) Inventor: George James Gibberd, Bristol (GB)

(73) Assignee: Tidal Generation Limited, Bristol (GB)

( * ) Notice: Subject to any disclaimer, the term of this patent is extended or adjusted under 35 U.S.C. 154(b) by 1180 days.

(21) Appl. No.: 12/593,698

(22) PCT Filed: Apr. 11, 2008

(86) PCT No.: PCT/GB2008/001289
§ 371 (c)(1),
(2), (4) Date: Oct. 27, 2009

(87) PCT Pub. No.: WO2008/125830
PCT Pub. Date: Oct. 23, 2008

(65) Prior Publication Data
US 2010/0119309 A1   May 13, 2010

(30) Foreign Application Priority Data

Apr. 12, 2007   (GB) .................................. 0707151.7

(51) Int. Cl.
*E02D 7/00* (2006.01)
*E02D 7/28* (2006.01)
*E02B 17/00* (2006.01)
*E02D 31/02* (2006.01)
*E02D 5/28* (2006.01)
*E02D 7/18* (2006.01)
*E02D 5/72* (2006.01)
*E02D 27/52* (2006.01)
*E02D 15/08* (2006.01)
*E02D 7/10* (2006.01)
*E02D 27/50* (2006.01)
*E02D 27/42* (2006.01)

(52) U.S. Cl.
CPC ................ *E02D 27/52* (2013.01); *E02D 15/08* (2013.01); *E02D 7/10* (2013.01); *E02D 27/50* (2013.01); *E02D 7/28* (2013.01); *E02D 27/42* (2013.01)
USPC ........ 405/228; 405/195.1; 405/224; 405/229; 405/231; 405/232

(58) Field of Classification Search
USPC ............... 405/228, 229, 231, 232, 233, 195.1
See application file for complete search history.

(56) References Cited

U.S. PATENT DOCUMENTS 2,579,720 A  *  12/1951  Atkinson ...................... 175/323
3,094,847 A  *   6/1963  Pogonowski ................. 405/204
(Continued)

FOREIGN PATENT DOCUMENTS

EP            0 013 602         7/1980
EP          0013602 A1  *     7/1980
(Continued)

OTHER PUBLICATIONS

PCT International Preliminary Report on Patentability for International application PCT/GB2008/001289 dated Oct. 13, 2009 (9 pages) for companion EP case.

(Continued)

*Primary Examiner* — Benjamin Fiorello
*Assistant Examiner* — Edwin Toledo-Duran
(74) *Attorney, Agent, or Firm* — Oliff PLC

(57) ABSTRACT

A method of installing a structure on a bed of a sea, estuary or river from a floating installation vessel is described. In such a method a plurality of attachment piles and corresponding installation rigs are attached to the structure prior to deployment of the structure. In addition, respective umbilical control cables are connected to the installation rigs prior to deployment of the structure. The structure is deployed from a floating vessel to a bed of a sea, estuary or river, such that, when the structure is located on the bed, the umbilical control cables do not support the structure or installation rigs. A single installation operation for each attachment pile is performed, in which operation an installation rig is activated so as to install fully the corresponding attachment pile in the bed, without removal of the umbilical control cable or the installation rig therefrom.

35 Claims, 7 Drawing Sheets

(56) References Cited

U.S. PATENT DOCUMENTS

| | | | |
|---|---|---|---|
| 3,134,235 A * | 5/1964 | Parker et al. | 405/228 |
| 3,846,991 A * | 11/1974 | Wisotsky | 405/228 |
| 3,927,722 A * | 12/1975 | Frederick | 173/125 |
| 4,033,139 A * | 7/1977 | Frederick | 405/228 |
| 4,069,683 A * | 1/1978 | Jansz | 405/227 |
| 4,117,690 A * | 10/1978 | Besse | 405/227 |
| 4,154,307 A * | 5/1979 | Gendron et al. | 173/21 |
| 4,202,421 A * | 5/1980 | Pinck | 175/426 |
| 4,214,843 A * | 7/1980 | Rohde | 405/225 |
| 4,238,166 A * | 12/1980 | Gendron | 405/228 |
| 4,679,964 A * | 7/1987 | Blandford | 405/216 |
| 4,727,943 A * | 3/1988 | Wood | 175/229 |
| 4,812,080 A * | 3/1989 | Urquhart et al. | 405/227 |
| 4,818,149 A * | 4/1989 | Kuehn | 405/228 |
| 4,856,938 A * | 8/1989 | Kuehn | 405/227 |
| 4,872,514 A * | 10/1989 | Kuehn | 173/132 |
| 4,904,119 A * | 2/1990 | Legendre et al. | 405/228 |
| 4,966,498 A * | 10/1990 | Blum | 405/233 |
| 5,421,676 A * | 6/1995 | Wybro et al. | 405/223.1 |
| 5,667,341 A * | 9/1997 | Kuehn | 405/228 |
| 5,788,418 A * | 8/1998 | Kuehn | 405/228 |
| 5,915,883 A * | 6/1999 | Kuehn | 405/228 |
| 2008/0292407 A1* | 11/2008 | Jonker et al. | 405/228 |

FOREIGN PATENT DOCUMENTS

| | | | | |
|---|---|---|---|---|
| EP | 0301114 A1 * | 2/1989 | | |
| EP | 1 493 868 A1 | 1/2005 | | |
| EP | 1493868 A1 * | 1/2005 | | |
| GB | 1552162 A * | 9/1979 | | |
| GB | 1552162 A1 * | 9/1979 | | E02D 5/56 |
| GB | 2 395 510 A | 5/2004 | | |
| JP | 60003319 A * | 1/1985 | | |
| WO | WO 2005040605 A1 * | 5/2005 | | |
| WO | WO 2005/040605 | 5/2006 | | |

OTHER PUBLICATIONS

Internation Search Report PCT/GB2008/001289 dated Nov. 7, 2008 (3 pages).

U.K. Intellectual Property Office's Search Report corresponding to Application No. GB0707151.7, dated Aug. 8, 2007.

* cited by examiner

INSTALLATION OF UNDERWATER GROUND ANCHORAGES

The present invention relates to the installation of underwater ground anchorages.

It is becoming clear that installing high integrity foundation structures for power generating plant in sites of fast-moving water poses several new problems which cannot be addressed using existing marine construction practice.

It is standard practice to install offshore jacket type structures, such as those used for oil and gas platforms, using attachment piles. The majority of these structures are founded on relatively soft deposits rather than on rock, and the technique involves driving attachment piles down into the sea bed through hollow vertical cylindrical pile sleeves that are attached to the bottom of each leg of the structure. Once an attachment pile has been driven to depth, the annulus between its outside diameter and the inside diameter of the pile sleeves is filled with grout to form a secure attachment to the sea bed.

Piled jackets, in particular tripods, are a cost-effective means of supporting water current energy generating plant. Many such sites, in particular those where fast tidal streams are present, have rocky or hard beds, however, and this mitigates against pile driving or the use of helical screw piles. Instead rock sockets must be drilled in the bed, into which the attachment piles can be installed and grouted in the usual manner. It is the drilling of these rock sockets in sites of fast flowing water that creates the particular problems for previously considered techniques.

There are two main features of such previously considered rock socket drilling techniques:
(i) the platform from which drilling is carried out and controlled, and;
(ii) the type of drilling equipment used.

Considering the drilling platform:

Existing methods of drilling underwater rock sockets require that the drilling vessel remain directly above the drilling site, within a close tolerance (typically a few meters). This is because the drilling equipment cannot tolerate the lateral bending arising from significant relative displacements between the vessel and the bed. In very deep water the positional tolerance can be relaxed slightly owing to the inherent flexibility of the long drill strings, however in the modest water depths in which a significant proportion of the water current energy resource lies (up to 80 m) it is important to ensure the vessel remains closely on station.

There are currently two options for staying on station when drilling: using fixed vessels such as jack-ups or moored drilling platforms, or using dynamically positioned (DP) drilling ships. Both options have certain problems for use with water current energy installations:
(i) Near-shore construction jack-ups are not generally feasible because they cannot stand in water depths more than ~30 m in fast currents; the larger offshore vessels such as Mobile Drilling Units (MDU's) which can accommodate the environmental conditions are prohibitively expensive for renewable energy applications and are much less readily available.

The use of a moored barge or vessel would enable a wider choice of installation platform. However, it is difficult to achieve the required positional accuracy using moorings in high currents, and additional effort (and vessels) is required to lay out the moorings. In addition, the moorings themselves need to be very substantial in order to withstand the high currents.
(ii) DP vessels are specialist and expensive, and are also not readily available. Few if any existing DP vessels can hold position in fast tidal currents which can reach 10 knots; this is many times faster than is normally encountered in offshore construction. The effectiveness of the lateral bow and stern thrusters which these vessels use to maintain position is significantly reduced at the higher currents, meaning that the station keeping capability is reduced. Installation of a foundation for a water current energy plant could therefore only be carried out on the lowest neap tides in most instances, effectively reducing the annual construction window by a factor of at least three. DP vessels consume significant quantities of fuel in holding position (up to £10,000 per day depending on their size).

Setting up a DP vessel to hold station accurately for drilling takes time, as does setting up heave compensation and adjusting the drill string tensions. DP vessels are expensive and for renewable energy applications it is critical to minimize the time required for installation.

Operations with DP vessels become cheaper, easier and safer the larger the station-keeping tolerance; positioning a vessel within a large working circle (say 100 m radius) can be achieved through use of the main engines and rudder as opposed to continuous use of thrusters.

In addition to lateral station holding, vertical positioning is also an issue for drilling. Existing drilling techniques require heave-compensated or constant-tension lifting equipment (or similar) in order to accommodate the vertical motion of the drill ship relative to the fixed drill site on the bed; this is because the drilling equipment cannot tolerate the impacts with the bed that would otherwise arise with an axially rigid drill string. Also, there is the risk of the drill being lifted completely out of the hole that it is in the process of forming as the vessel heaves, and thereby having to abort the operation. Heave compensation is expensive and complicated and consumes additional energy.

There are further problems associated with using existing techniques in fast moving streams:
(i) multiple attachment piles are required for each jacket foundation, e.g. three for a tripod as a minimum;
(ii) using a single pile installation (e.g. drilling) rig and existing deployment techniques, multiple alignments and set-ups are required, once for each pile;
(iii) the transfer of a rig from one foot to another, and the alignment and set-up on the next foot can only practicably be achieved at slack water;
(iv) on spring tides, the slack water operational window is short, maybe a matter of ten to fifteen minutes. The transfer of installation equipment underwater from one foot to another is therefore a difficult operation that carries a significant risk of failure leading to delay to the next tidal cycle (i.e. the next slack water period ~6.5 hrs later). It is also difficult if not impossible to achieve transfer during spring tides when the slack water periods are shortest, which limits the available installation window to a few days per month.

It can be seen, therefore, that clear advantages would arise from an improved means of drilling rock sockets in sites of high currents which could:
(i) avoid the need to maintain close station-keeping, so that a working circle of the order 100 m radius, possible more, could be used;
(ii) be capable of implementation from a range of small, agile, non-specialist, readily available surface vessels;
(iii) be capable of implementation in any water depth up to at least 80 m;

(iv) avoid the need to provide heave-compensated lifting;
(v) avoid the need to align and set-up installation equipment underwater;
(vi) avoid the need for multiple alignments and set-ups, with equipment transfer from one foot to the next only achievable at slack water.

U.S. Pat. No. 4,904,119 presents a previously considered system in which the foundation structure itself is used as a drilling template, and onto which a drilling rig is lowered from the surface on tension guide wires. The rig is operated via leads and control connections from the surface vessel.

It is important to note, however, that this system uses constant-tension guide wires to lower the drill onto the foundation, and requires these wires to be in place throughout the drilling process as guidance for the drill rig and attachment pipe as the socket progresses. This system is therefore unsuitable for use in strong water currents because:

(i) one or more constant tension guide wires are required to be in place at all times from the surface vessel, supporting and guiding the drilling head. This means that the surface vessel must remain directly above the drilling site, since the drill rig is not actively clamped to the seabed structure and any lateral component of force would be de-stabilising;

(ii) it requires an active heave-compensation system on the surface vessel in order to control the vertical position of the drill rig within the water column and prevent damaging impacts with the sea bed and/or structure as it is lowered into place. Once the drill is in place, it has to keep the wires sufficiently taught to provide guidance, but must not lift the rig up off the seabed structure which would disrupt the drilling process. These features limit the sea state in which the drilling can be carried out, because heave compensation is not perfect and some residual vertical motion will always be present;

(iii) fast water currents will cause significant lateral drag and possibly vortex-induced vibration of both the guide wires and the exposed parts of the drilling equipment and attachment pipe that are not protected within the seabed structure;

(iv) it is a single rig system, requiring the transfer of equipment from one foot to another underwater, and the attendant problems with this as described above.

Consider now the prior art with regard to offshore drilling equipment for large diameter (i.e. of the order of 1 m) rock sockets. This is accomplished using rotary drilling equipment, however there are problems associated with this: first, there is little if any of such equipment capable of operation underwater, and secondly, the equipment is large and relatively complex, and requires to be mounted on a structure which can react the large torques generated. A very significant vertical load also has to be applied to the drill in order for the drill bit to function properly, and this either requires a heavy drill string or an actively applied downwards force which has to be reacted by the deployment vessel.

It can be seen, therefore, that prior art does not offer a practicable solution for installing structures in sites of fast flowing water currents.

Embodiments of the present invention may provide a means of installing a foundation, mooring or anchorage based on the use of remotely operated pile installation equipment to secure framework type foundation structures such as tripods or jackets. Embodiments are particularly suited to the installation of structures that are totally submerged, and for structures that are to be located in fast flowing currents.

Such a technique is generic and therefore suitable for any type of seabed anchorage or mooring. The main applications discussed below, however, are foundations for ocean and water current energy systems, for example wave, offshore wind and in particular tidal stream energy conversion systems. The description of embodiments of the present invention presented here will focus on tidal stream applications, but the wider applicability should be noted.

The prime application is based on the use of special drilling rigs for sites where the bed is rocky or hard, which pose particular problems for existing equipment; it is also applicable, however, to softer beds where the use of driven piles or screwed piles is appropriate.

According to one aspect of the present invention, there is provided a method of installing a structure on a bed of a sea, estuary or river from a floating installation vessel, the method comprising:

installing a plurality of attachment piles and corresponding installation rigs to the structure prior to deployment of the structure;

connecting respective umbilical control cables to the installation rigs prior to deployment of the structure;

deploying the structure from a floating vessel to a bed of a sea, estuary or river, such that, when the structure is located on the bed, the umbilical control cables do not support the structure or installation rigs; and performing a single installation operation for each attachment pile, in which operation an installation rig is activated so as to install fully the corresponding attachment pile in the bed, without removal of the umbilical control cable or the installation rig therefrom.

According to another aspect of the present invention, there is provided a system for installing a structure on a bed of a sea, estuary or river from a floating installation vessel, the system comprising:

a plurality of attachment piles and corresponding installation rigs which are adapted for attachment to the structure prior to deployment of the structure;

respective umbilical control cables adapted for connection to the installation rigs prior to deployment of the structure;

means for deploying the structure from a floating vessel to a bed of a sea, estuary or river, such that, when the structure is located on the bed, the umbilical control cables do not support the structure or installation rigs; and a control system for performing a single installation operation for each attachment pile, in which operation the control system is operable to activate an installation rig so as to install fully the corresponding attachment pile in the bed, without removal of the umbilical control cable or the installation rig therefrom.

Other aspects of the present invention are described in the attached claims.

Reference will now be made, by way of example only, to the accompanying drawings, in which.

Figure 1A:
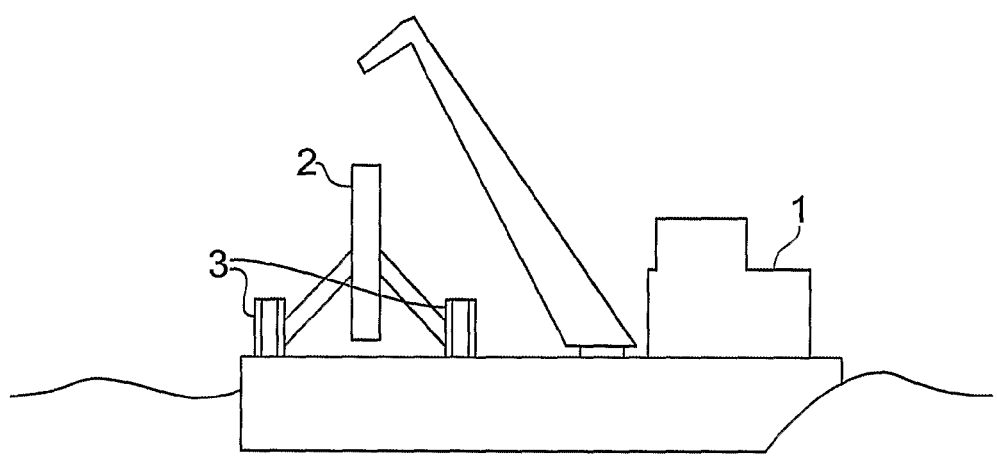
FIGS. 1a to 1e illustrate steps in a method embodying one aspect of the present invention.
Figure 1B:
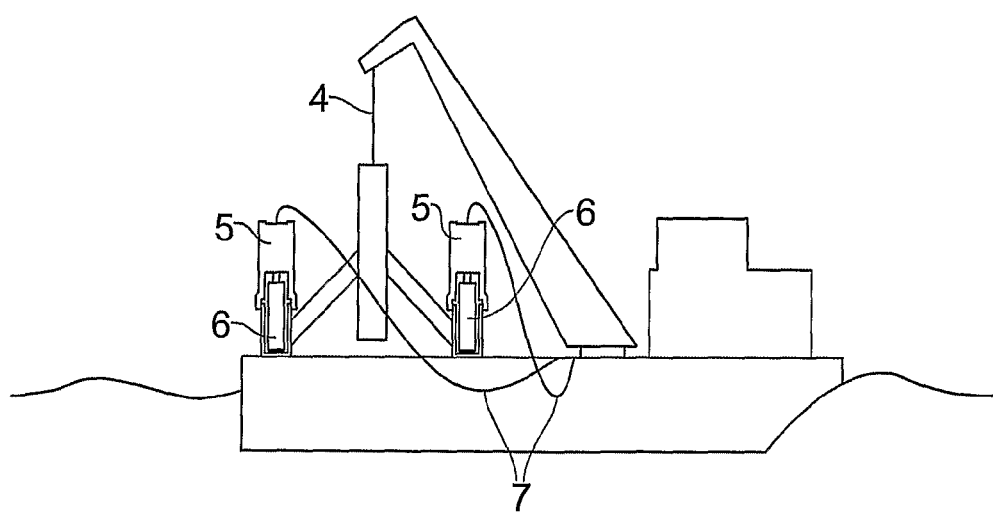

Embodiments of the present invention will now be described with reference to the drawings. Referring to FIG. 1a, a transport boat ("installation vessel") 1 is used to carry a load-bearing structure 2 to an installation site located on a bed of a sea, estuary, or river.

The structure has two or more support feet 3, comprising hollow members through which the attachment piles 6 are installed and secured, as will be described in more detail below. Installation rigs 6 are attached to each of the support feet 3 of the structure 2, in advance of the structure 2 being deployed to the bed. Umbilical control cables 7 are connected to respective installation rigs 5, again before the structure is deployed to the bed. The umbilical control cables are flexible, as will be discussed in more detail below.

A lifting tether 4 of a crane of the transport vessel 1 is attached to a suitable point, for example the top, of the structure 2. The structure 2, with the pre-installed installation rigs 6 and umbilical control cables 7 attached, is then lowered to the bed on which it is to be installed.

The umbilical control cables 7 connect the installation rigs with a control vessel on the surface. The cables are preferably multi-strand and carry power and control signals to and from the installation rigs enabling remote control of the installation process from the surface control vessel.

Figure 1C:
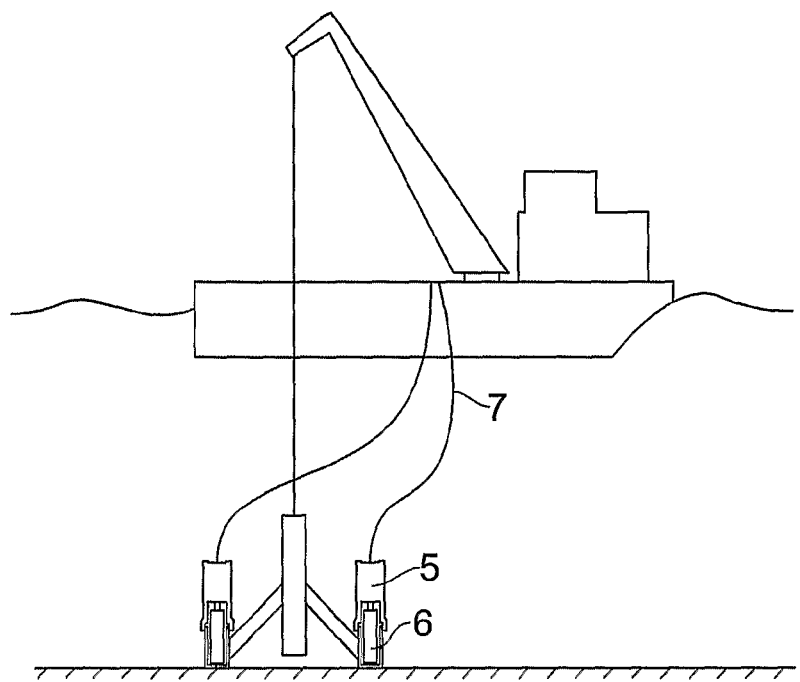
Figure 1D:
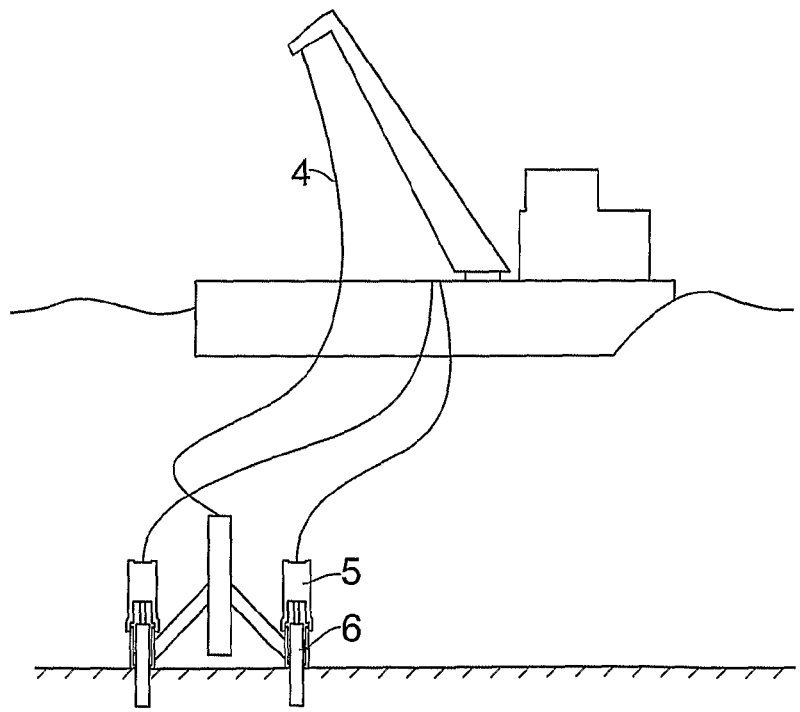
Figure 1E:
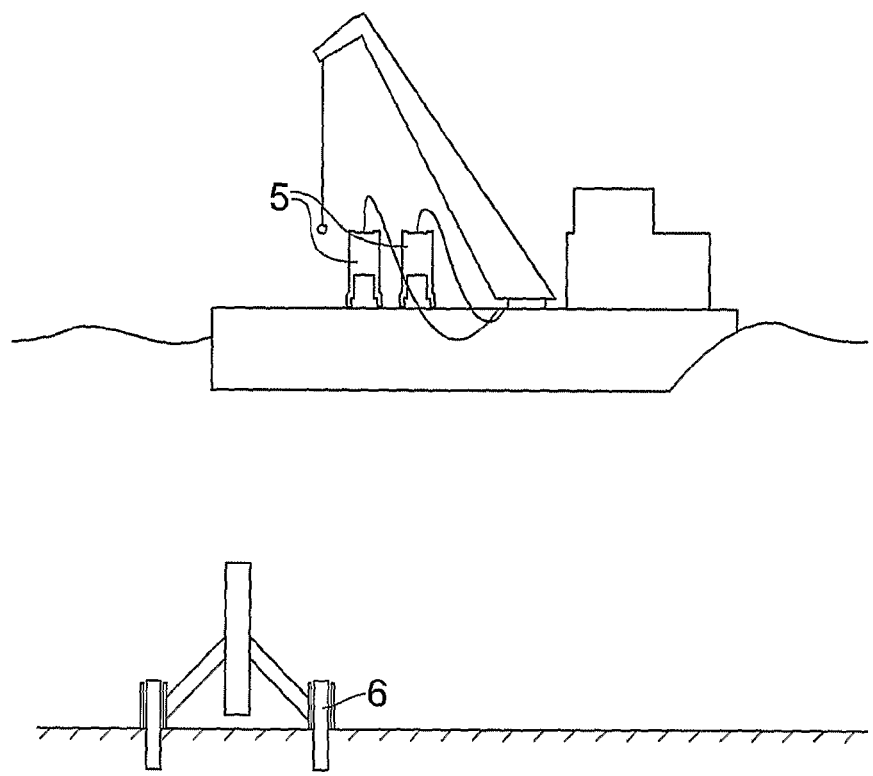

In FIG. 1c the structure has been placed on the bed using the crane on the transport vessel 1. Once the structure 2 is supported by the bed, the main tether 4 is slackened in order to allow the transport vessel to maintain a wide working circle whilst the installation operation is carried out. The umbilical control cables 7 do not support the structure 2 or the umbilical control cables 7, and are flexible so that movement of the vessel 1 does not interfere with the installation operation. The installation rigs 5 are activated remotely via the umbilical control cables, in order that the attachment piles can be secured to the bed.

In embodiments of the present invention, the attachment piles are installed fully into the bed in a single operation, without the removal of the installation rigs 5 or umbilical control cables 7. Such a single operation enables efficient installation of the attachment piles.

In one embodiment, the installation rigs 5 are detached from the structure 2 remotely using the umbilical control cables 7. Such remote detachment removes the need for expensive ROV (remotely operated vehicle) operations to be carried out. In a further development, the umbilical control cables include a lifting strand which is capable of lifting an installation rig 5. Such a provision enables the installation rig 5 to be detached from the structure 2, and recovered to the surface vessel without the needs for additional and expensive marine operations.

In another embodiment, when the structure has been lowered to the bed and the main tether 4 slackened, the main tether 4 and the umbilical control cables 7 at the surface can be transferred from the transport vessel 1 to a smaller control vessel which is used for the drilling operations only. This frees up the main vessel for the placement of another structure, and enables the use of a smaller vessel which is more agile in the high water currents and only needs sufficient crane capacity to recover the installation rigs. The main tether 4 can be released from the structure using a quick-release clamp and a remotely operated vehicle (ROV).

The installation rigs 5 can be operated sequentially or substantially simultaneously. The multiple strands of the umbilical control cables can be pre-secured together, for example by tying together at intervals along their length, before placement of the structure 2 on the bed. In this way a single strong strand can be formed capable of withstanding current-induced vibration.

Figure 2:
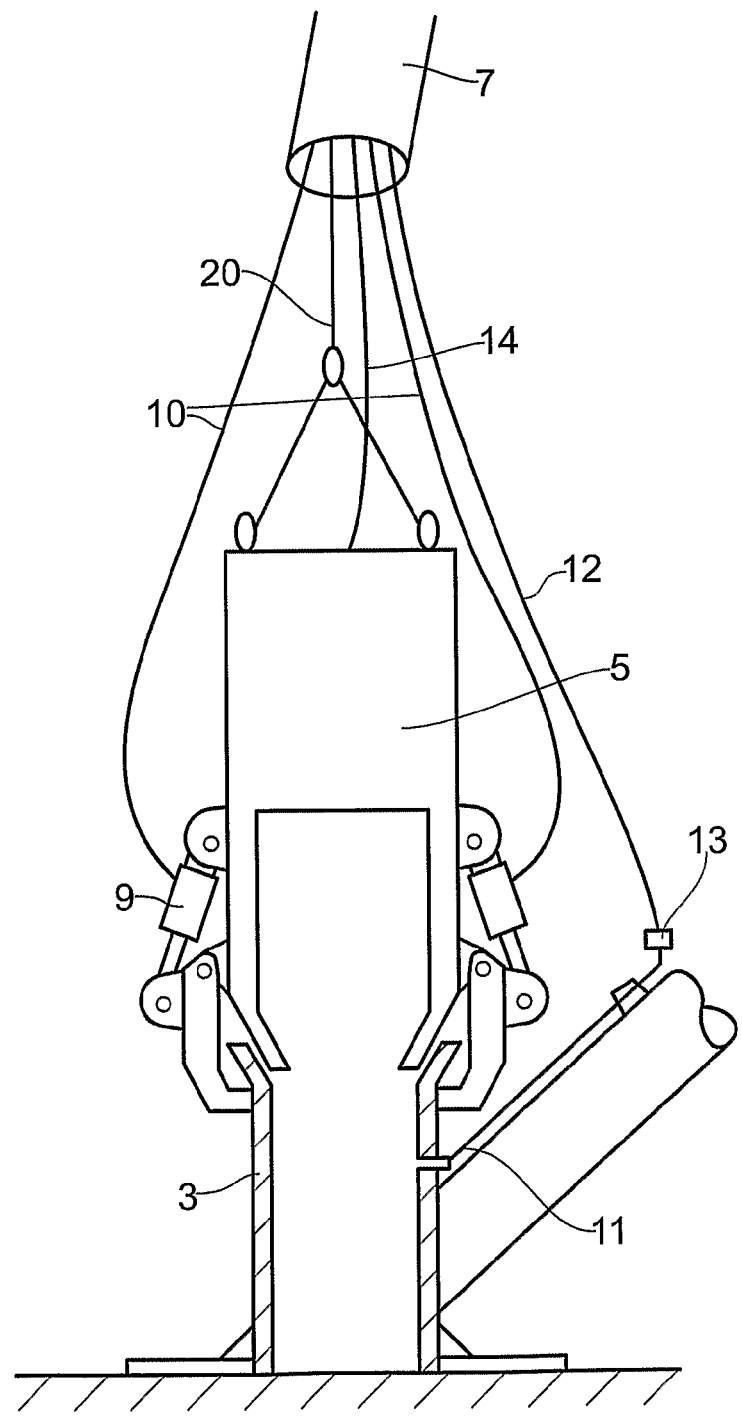
FIG. 2 is a cross-sectional view of a typical foot of a load bearing structure.

FIG. 2 illustrates a cross sectional view of a foot 3 of a structure 2 (not shown for clarity), with an installation rig 5 clamped thereto. For clarity the interior arrangement of the installation rig 5 and attachment pile are not shown in this figure. A clamping mechanism 9 is provided in order to clamp the installation rig 5 to the foot 3. The clamping mechanism 9 is operated remotely from the surface via a dedicated control strand 10. Operation of the clamping mechanism may be achieved hydraulically, pneumatically or electrically. A strand 14 of the umbilical control cable 7 provides services (power, control signals etc) necessary to operate the installation rig 5 remotely from the surface.

In one embodiment, a pre-installed grout pipe 11 is provided. The grout pipe 11 penetrates a wall of the foot 3, and is fed via another strand 12 of the umbilical control cable 7. This strand 12 is used to inject grout from the surface into the annulus which is formed between the attachment pile and the structure, and, in the case of drilled rock sockets, between the outer diameter of the attachment pile and the rock socket, in order to secure the load-bearing structure to the bed. On completion of grouting the grout line can be disconnected from the load bearing structure by using an ROV to operate a quick-release coupling 13, enabling the casing and pile installation rig to be recovered to the surface by lifting the casing on strand 20 of the umbilical 7. In an alternative embodiment, the grout pipe 11 is disconnected remotely from the control vessel using the umbilical control cable 7.

FIG. 2 also illustrates the provision of a lifting strand 20 which is arranged to allow the installation rig to be recovered from the structure 2 following installation of the attachment pile into the bed.

One particular embodiment of the present invention makes use of a percussive drilling technique, and will be described below. It is to be noted that the principles of the present invention are not restricted to the use of percussive drilling.

Figure 3A:
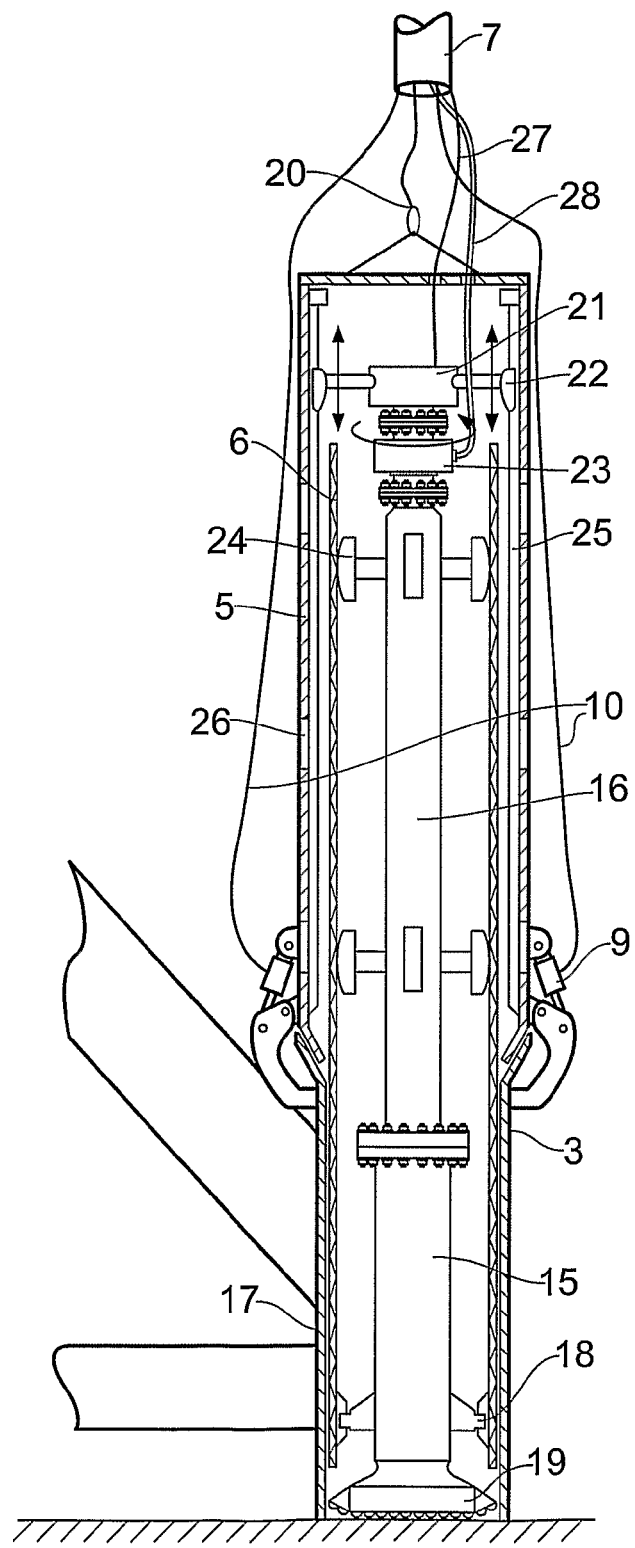
FIGS. 3a, 3b & 3c are respective cross-sectional views of the load bearing structure during steps in a method embodying one aspect of the present invention.

FIG. 3a is a cross sectional view of the foot 3 and the installed installation rig 5. It will be readily appreciated that each of the feet of the structure has a pre-installed installation rig 5. The installation rig 5 is attached to an upper region top of the foot 3 using a clamp arrangement 9 powered via strands 10 of the umbilical control cable 7. The installation rig 5 is connected at its upper region to a lifting tether 20 which forms a strand of the umbilical control cable 7, and which is used to recover the casing on completion of pile installation.

A percussion drill assembly is shown in FIG. 3a with a drill bit 19 at the bed ready to start drilling. The assembly comprises a vertical drive motor and clamp unit 21, a rotary indexing motor 23, an extension pipe 16, a percussion hammer 15 and a percussion drill bit 19. The drill bit 19 is radially retractable such that it can fit down inside the attachment pile 6; it is shown in FIG. 3a in its extended position, in which it drills a hole larger than the outside diameter of the attachment pile, forming an annulus allowing the pile to follow the drill down into the rock socket as drilling progresses. The drill assembly is supported at it upper region by clamps 22 which run on vertical guide rails 25 fixed to the inside of the casing of the rig 5. By operating the drive motor and clamp unit 21 the drill assembly can be allowed to drop onto the bed for drilling, or can be raised up after drilling is complete, or can be clamped to the casing of the rig 5 in any intermediate vertical position. The motor and clamp unit 21 is operated via a motor control strand 27 of the umbilical control cable 7.

The indexing motor is operated by an index control strand 28 of the umbilical control cable, and serves to rotate the drill between hammer blows to ensure an even drilling process. The index control strand 28 also provides the services necessary to operate the drill hammer 15, the services being led down through the inside of an extension piece 16. The casing of the installation rig 5 and an extension piece 16 are made to the correct length necessary to achieve the required depth of rock socket.

An attachment pile 6 is fitted around the outside of the drill assembly, and is guided by guide members 24. The pile 6 is supported from the body of the drill by a mechanical attachment 18 that can be remotely released. The release is activated by the index control strand 28.

Drilling is initiated by activating the drill hammer and releasing the clamps 22 via the clamp unit 21. This allows the unit to progressively drill a vertical hole under its own weight; one of the chief advantages of percussion drilling over rotary drilling in that no significant drilling forces are reacted to the structure, the torque from the indexing motor being negligible and the hammer inertia loads being axial and reacted by the bed. If additional weight is required for the drill to function correctly under particular bed conditions, then the extension tube 16 can be ballasted. As the drill rig moves downwards as the socket progresses, the umbilical strands 27 & 28 are able to pass down through holes in the top of the casing of the rig 5. For shallow sockets of a few meters depth, which are likely to be adequate in most rock beds, no special umbilical handling arrangements are necessary and the necessary slack can be coiled up inside the casing on top of the motor drive and clamp unit 21. Deeper sockets may require a separate handling system, and standard systems exist e.g. for handling ROV umbilicals, which could be fitted inside the casing space.

Figure 3B:
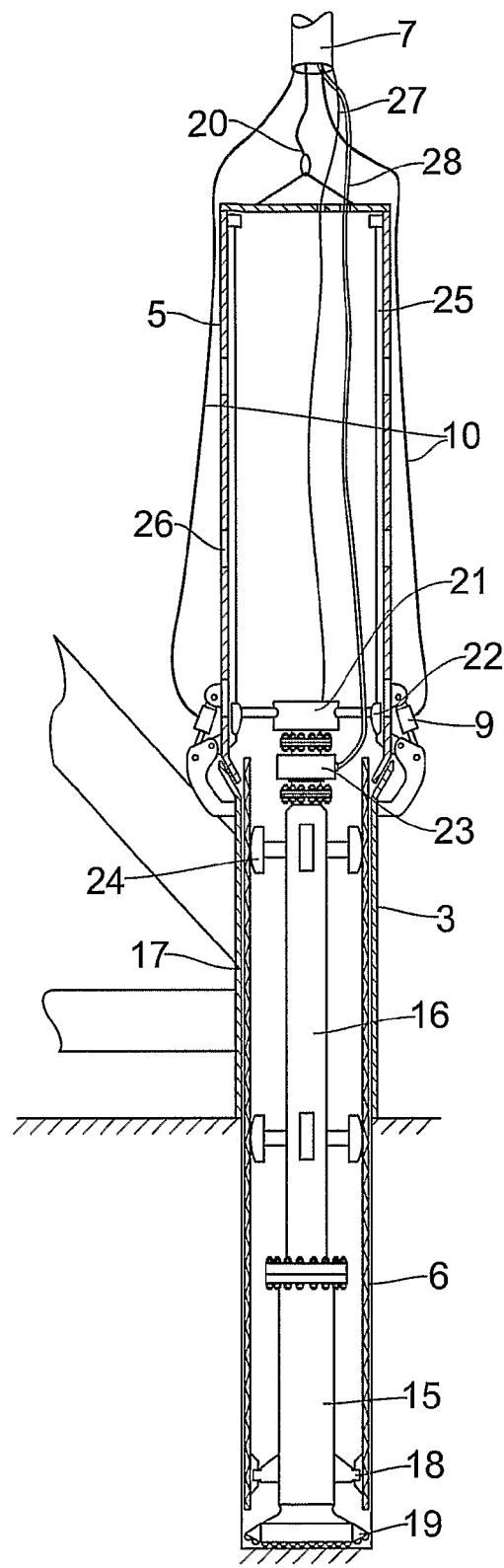

Referring to FIG. 3b, the drill string has made a hole in the bed. The drillings are carried away by the exhaust fluid (e.g. air) from the hammer unit which emerges across the drill face and passes up the annulus between the drill and the attachment pile to emerge either from the top of the attachment pile, or out through holes 26 made in the wall of the casing 5. Once the required depth of hole has been drilled, the drill bit 19 is retracted radially and the remotely detachable fitting at the base of the percussion drill 18 is released. The drill assembly can then be lifted out vertically back up into the casing 5 using the drive motor 21, leaving the attachment pile 6 in the socket.

Figure 3C:
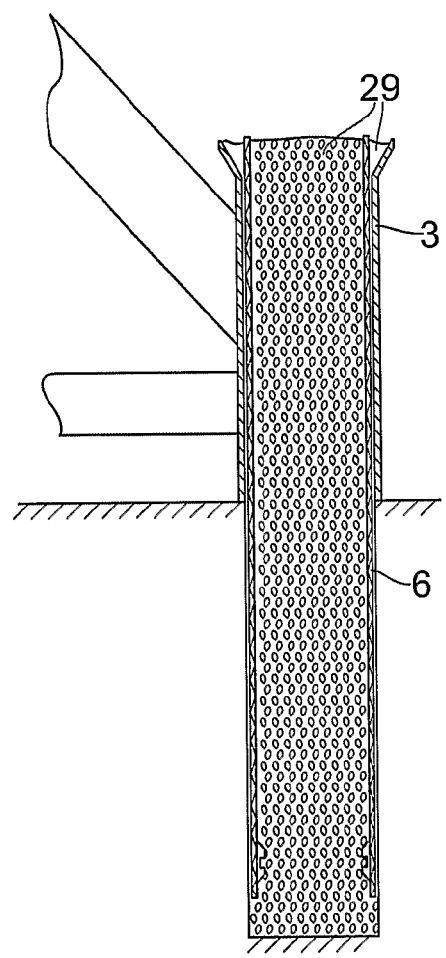

Referring to FIG. 3c, the drill assembly and casing have been removed from the foot leaving the attachment pile 6 in place. Grout 29 is pumped into the annulus between the attachment pile and the inside of the support structure foot 3, and flows inside the attachment pile itself. The grout can be supplied from the surface vessel as described with reference to FIG. 2.

It should be noted that FIGS. 3a,b,c show only one possible way of implementing the invention which uses a fluid-driven percussion drill in such a way that all operations can be remotely controlled via umbilical strands either hydraulically, pneumatically or electrically. A rotary drill could be employed in a similar fashion, and there exist under-reaming rotary drill bits that can similarly be radially retracted. Rotary drilling would require additional ballast weights to provide the necessary drilling force, and a larger indexing motor 23 would be required to provide the drive torque. The guides 22 and guide rails 25 would also have to be made strong enough to carry the large drive torque through to the casing of the rig 5, and the clamps 9 would then have to carry the reaction torque through to the foot of the load bearing structure 2.

It can be seen from FIGS. 3a to 3c that the casing of the rig 5 could also support other types of pile installation equipment, such as underwater pile drivers and augur rigs for helical piles, such that pre-installation and simultaneous operation of multiple rigs is possible from the surface.

Embodiments of the present invention are particularly suited to hard rock beds, and percussive drilling is particularly suited to drilling into such hard rock beds. For softer sites, it would be possible to use conventional pile driving or helical pile (auger) installation techniques. This equipment could be incorporated into pre-installed pile installation rigs in a similar manner to percussive drilling rigs described above.

In summary, embodiments of the present invention make use of:
(i) the pre-installation and securing of multiple pile installation rigs onto the structure prior to lowering the foundation structure onto the bed. This avoids the need for underwater transfer and re-alignment of the installation equipment between feet on the structure at slack water;
(ii) the option for simultaneous operation of all the installation rigs to provide all the necessary pile sockets for a complete foundation in a single tidal cycle;
(iii) the deployment of the installation rigs via long flexible umbilicals from a surface vessel, which frees the vessel from having to maintain close lateral position over the drill site. (The drilling vessel can be separate from the heavy lift vessel which places the foundation on the sea bed). This removes the requirement for a stable surface platform such as a jack-up, MDU, or DP vessel, and permits the use of small non-specialist vessels for the installation. It also removes the need for tension guide wires and heave compensation equipment. Together these features enable the technique to be used in areas of strong water currents;
(iv) the deployment of the installation rigs inside the attachment pile, the drill and pipe together being placed inside a casing structure that protects them from current and wave loading. The casing is secured to the foundation structure and reacts the current and wave loads, and also the umbilical drag loads, directly into the seabed structure. This enables installation operations to be carried out in maximum currents on spring tides, maximizing the installation window for these structures;
(v) for rocky or hard sites, the use of large diameter percussive drills. This technology has not previously been used offshore, or in deep water, or deployed from a non-fixed platform. Percussion drills significantly reduce the complexity of sub-sea drilling compared with rotary drills, and enable the sockets to be drilled to the required depth in a single pass. Percussive drills impose negligible torsional loads (i.e. loads about their vertical axis) on the seabed structure, making them ideally suited to using the seabed structure as a simple support and axial guidance template;
(vi) for rocky or hard sites, the use of under-reaming drill bits that can initially be expanded to a diameter greater than that of the attachment pile, such that the attachment pile follows the drill bit down into the socket leaving a grout annulus between the outside of the pile and the wall of the drilled socket. On completion of drilling the drill bit is remotely and automatically retracted to allow the drill to be raised up into the protective casing leaving the attachment pile in the socket. The grout annulus is then filled via pre-plumbed grout lines fed from the surface umbilicals. This single-pass method of drilling is significantly less complex that prior art techniques;
(vii) for softer sites, the use of pre-installed pile installation rigs in a similar manner, e.g. underwater pile drivers or auger rigs.

Embodiments of the present invention have significant advantages over previously considered techniques, including:
(i) pre-installation of the pile installation equipment on the foundation structure prior to placement on the bed removes the need for aligning and setting up equipment underwater, enabling this to be done at the surface. It also removes the need for the risky underwater transfer of equipment at slack water periods;

(ii) simultaneous operation of multiple pile installation rigs gives rise to substantial reductions in the time required for installation. Simultaneous deployment of multiple drilling rigs is not possible using existing techniques wherein the drills are positioned and held on station using tension guide wires;

(iii) the operation of the pre-installed installation rigs and the pile grouting system via long flexible umbilicals eliminates the need for an expensive surface platform ship (MDU), DP vessel, or a heave-compensated crane. The complete pile installation can therefore be achieved using smaller, cheaper, more readily-available non-specialist vessels, and can be carried out in higher sea states;

(iv) the deployment of the pile installation equipment within a protective casing clamped to the seabed structure (e.g. the pile attachment sleeve forming the foot of a jacket structure) protects it from water currents and umbilical drag loads, and enables installation in fast water currents. Using prior art techniques, drilling in sites of high currents is not possible;

(v) pre-installing the pile installation equipment, e.g. on-shore or on the deck of the foundation transport vessel, enables the operators to check the alignment of the attachment pile within the pile sleeve and confirm the clamping and operation of the installation equipment prior to deployment. Prior art techniques do not allow this but rely on achieving adequate alignment underwater, which is more risky;

(vi) unlike most offshore oil and gas industry structures, which typically weigh hundreds or thousands of tons, a water current energy foundation typically weighs less than 100 tons, and indeed it is desired to use the lightest weight foundations possible in order to produce cost-effective energy. This low weight is frequently insufficient to prevent the structure sliding along the sea bed under the maximum current drag loads, e.g. those arising in a peak spring tide. It is therefore necessary to add extra temporary weight (kentledge) to stabilize the structures by gravity, prior to installation. Under the present invention, this kentledge is provided by the pre-installed pile installation equipment, which can be designed to be sufficient. This avoids the complication and time at sea required to add and remove temporary kentledge. It also enables installation operations to proceed throughout a peak spring tide if necessary, at a tidal stream site;

(vii) the weight also ensures stability of the foundation should the installation have to be temporarily aborted. If installation is aborted, for example the surface vessel has to move off site owing to bad weather, the piles and equipment may be left in-situ on the foundation structure, and installation can re-commence on re-connection of the umbilical when the vessel returns. This is not possible with a tension guide wire support system which would require additional kentledge weights to be installed to stabilize the structure, and on the vessel's return would require the pile and installation equipment to be re-aligned with the seabed structure.

Furthermore, specific advantages arise through use of embodiments of the present invention in combination with down-hole percussive drilling techniques:

(viii) percussive drilling is a rapid process ideally suited for hard rock. Drill rates of up to ~3 m to 4 m/hr in hard abrasive rock at 0.9 m diameter are reported, typically more than twice as fast as conventional rotational drilling. Combined with simultaneous multiple drilling, this achieves a very rapid installation time;

(ix) percussive drilling rigs are available with radially retractable drill bits, which enable the attachment pile to follow the drill down into the socket under gravity to the required depth in a single pass, and the drill bit to then be retracted and raised out of the socket in a single lift. This is a considerably less complex and risky process than the rotary drilling equipment described in the prior art, and again is a much quicker process because it does not require a secondary back-reaming operation to achieve the final diameter;

(x) the exhaust air from percussive drills provides a bubble curtain around the drill bit, hammer and attachment. This provides an absorbent acoustic shield which prevents damaging impulsive noise and shocks being radiated from the drilling site;

With regard to sites where the bed is softer and drilled sockets are not feasible, underwater pile hammers and screw piling rigs are available and can be adapted in the same manner as the drilling rigs, and having most of the same advantages as outlined above.

A method embodying the present invention enables the simple, rapid installation of piled foundations at sites of fast flowing water currents, which cannot be achieved using prior art techniques. It enables the use of cheap, readily available vessels, and maximizes the time during which it is possible to carry out such installation operations at tidal stream sites. It is applicable to a range of bed conditions including rocky and hard sites, and to beds where driven or screw piles are feasible. It significantly reduces the installation time and risk as compared with prior art.

A method embodying the present invention for securing load bearing structures to the bed of the sea, river or estuary may comprise:

(a) pre-installing and securing two or more pile installation rigs onto the load-bearing structure prior to the structure being placed on the bed;

(b) placing the structure onto the bed;

(c) installing the attachment piles by means of operating the installation rigs remotely from the surface via one or more flexible umbilicals such that the umbilical(s) do not provide load-bearing support or guidance to the drilling equipment, and the umbilicals have sufficient slack such that the drilling operations are unaffected by vertical and horizontal motions of the surface vessel.

The invention claimed is:

1. A method of installing an underwater structure on a bed of a sea, estuary or river from a floating installation vessel, the method comprising:

installing a plurality of attachment piles to the structure prior to deployment of the structure;

attaching respective installation rigs to the attachment piles prior to deployment of the structure, each installation rig comprising apparatus necessary to install the attachment piles into the bed;

connecting respective umbilical control cables to the installation rigs prior to deployment of the structure;

deploying the structure from the floating installation vessel to a bed of a sea, estuary or river, such that, when the structure is located on the bed, the umbilical control cables support neither the structure nor the installation rigs; and performing a single installation operation for each attachment pile so as to install fully each attachment pile in the bed without attachment of additional apparatus to the attachment pile and without removal of the umbilical control cables from the respective installation rigs or the installation rigs from the attachment piles, wherein the single installation operation for each attachment pile is controlled from the floating installation vessel from which control signals are provided to each installation rig via the corresponding umbilical control cable; and during the single installation operation for each attachment pile, the umbilical control cables have sufficient slack so that the installation operation is unaffected by vertical and horizontal motions of the floating installation vessel.

2. The method as claimed in claim 1, further comprising, following activation of the installation rigs, releasing the installation rigs from the structure using the respective umbilical control cables.

3. The method as claimed in claim 1, further comprising, following activation of the installation rigs, releasing the installation rigs from the structure using the respective umbilical control cables, and retrieving the installation rigs using the respective umbilical control cables.

4. The method as claimed in claim 1, wherein a plurality of the installation rigs are activated at substantially the same time.

5. The method as claimed in claim 1, wherein the installation rigs are activated sequentially.

6. The method as claimed in claim 1, wherein each umbilical control cable is arranged to allow for movement of the floating installation vessel during activation of each installation rig, in order that such movement does not affect the single installation operation.

7. The method as claimed in claim 1, wherein each installation rig is a percussive drill.

8. The method as claimed in claim 1, wherein each installation rig is a rotary drill.

9. The method as claimed in claim 1, wherein each installation rig is a pile hammer rig.

10. The method as claimed in claim 1, further comprising providing a floating control vessel that is separate from the floating installation vessel.

11. The method as claimed in claim 1, further comprising providing a floating control vessel that is provided by the floating installation vessel.

12. The method as claimed in claim 1, wherein each installation rig comprises a drilling unit operable to form a hole in the bed, and wherein each attachment pile is displaced, during activation of the installation rig, into a hole in the bed formed by the corresponding drilling unit.

13. The method as claimed in claim 1, wherein each installation rig comprises a drilling unit operable to form a hole in the bed, and wherein each attachment pile is displaced, during activation of the installation rig, into a hole in the bed formed by the corresponding drilling unit, and wherein the attachment pile is hollow and the drilling unit is located within the attachment pile.

14. The method as claimed in claim 1, wherein each installation rig comprises a drilling unit operable to form a hole in the bed, and wherein each attachment pile is displaced, during activation of the installation rigs, into a hole in the bed formed by the corresponding drilling unit, and wherein each attachment pile is hollow and the drilling unit is located within the attachment pile, the method further comprising securing the attachment piles to the structure using grout supplied via the respective umbilical control cables.

15. The method as claimed in claim 1, wherein each installation rig comprises a drilling unit operable to form a hole in the bed, and wherein each attachment pile is displaced, during activation of the installation rigs, into a hole in the bed formed by the corresponding drilling unit, and wherein each attachment pile is hollow and the drilling unit is located within the attachment pile, the method further comprising securing the attachment piles to the structure using grout supplied via the respective umbilical control cables, and further comprising installing a grout pipe on the structure before deployment thereof, the grout pipe being used to distribute grout supplied via the respective umbilical control cables.

16. The method as claimed in claim 1, wherein each installation rig comprises a drilling unit operable to form a hole in the bed, and wherein each attachment pile is displaced, during activation of the installation rigs, into a hole in the bed formed by the corresponding drilling unit, and wherein each attachment pile is hollow and the drilling unit is located within the attachment pile, the method further comprising securing the attachment piles to the structure.

17. The method as claimed in claim 1, wherein the bed is substantially made of rock.

18. The method as claimed in claim 1, wherein the sea, estuary or river has high current flow characteristics.

19. The method as claimed in claim 15, further comprising installing a quick-release coupling configured to allow the respective umbilical control cables to disconnect from the grout pipe.

20. A system for installing an underwater structure on a bed of a sea, estuary or river from a floating installation vessel, the system comprising:

a plurality of attachment piles which are attached to the structure prior to deployment of the structure from the floating installation vessel;

a plurality of installation rigs adapted for attachment to respective attachment piles, each installation rig comprising apparatus necessary for driving the corresponding attachment pile into the bed of a sea, estuary or river;

clamping mechanisms configured to attach the installation rigs to the respective attachment piles attached to the structure prior to deployment of the structure from the floating installation vessel;

respective umbilical control cables adapted for connection to the installation rigs prior to deployment of the structure;

apertures and quick release couplings configured to attach the umbilical control cables to respective installation rigs attached to a structure prior to deployment of the structure from the floating installation vessel;

a main tether configured to deploy the structure from the floating installation vessel to a bed of a sea, estuary or river, such that, when the structure is located on the bed of a sea, estuary or river, the umbilical control cables do not support the structure or the installation rigs; and a control system, provided on the floating installation vessel, operable to activate each installation rig so as to install fully the corresponding attachment pile into a bed, without attachment of additional apparatus to the attachment piles and without removal of the umbilical control cable from the respective installation rigs or the installation rig from the attachment piles, the control system being operable to supply control signals to each installation rig via the corresponding umbilical control cable;

wherein the umbilical control cables are of sufficient length such that an installation operation is unaffected by vertical and horizontal motions of the floating installation vessel.

21. The system as claimed in claim 20, wherein the clamping mechanisms are configured to release the installation rigs from the structure following activation of the installation rigs.

22. The system as claimed in claim 20, wherein
the clamping mechanisms are configured to release the installation rigs from the structure following activation of the installation rigs; and
the umbilical control cables comprise lifting strands configured to retrieve the installation rigs following release of the installation rigs from the structure.

23. The system as claimed in claim 20, wherein the control system is operable to activate a plurality of the installation rigs at substantially the same time.

24. The system as claimed in claim 20, wherein the control system is operable to activate the installation rigs sequentially.

25. The system as claimed in claim 20, wherein each umbilical control cable is arranged to allow for movement of the floating installation vessel during activation of each installation rig, in order that such movement does not affect the installation operation.

26. The system as claimed in claim 20, wherein each installation rig is a percussive drill.

27. The system as claimed in claim 20, wherein each installation rig is a rotary drill.

28. The system as claimed in claim 20, wherein each installation rig is a pile hammer rig.

29. The system as claimed in claim 20, further comprising a floating control vessel that is separate from the floating installation vessel.

30. The system as claimed in claim 20, further comprising a floating control vessel that is provided by the floating installation vessel.

31. The system as claimed in claim 20, wherein each installation rig comprises a drilling unit operable to form a hole in a bed, and wherein each attachment pile is arranged to be displaced, during activation of the installation rigs, into a hole in the bed formed by the corresponding drilling unit.

32. The system as claimed in claim 20, wherein each installation rig comprises a drilling unit operable to form a hole in a bed, and wherein each attachment pile is arranged to be displaced, during activation of the installation rigs, into a hole in the bed formed by the corresponding drilling unit, and wherein each attachment pile is hollow and the drilling unit is located within the attachment pile.

33. The system as claimed in claim 20, wherein each installation rig comprises a drilling unit operable to form a hole in a bed, and wherein each attachment pile is arranged to be displaced, during activation of the installation rigs; into a hole in the bed formed by the corresponding drilling unit, and wherein each attachment pile is hollow and the drilling unit is located within the attachment pile, the system further comprising a grout system for securing the attachment piles to the structure using grout supplied via the respective umbilical control cables.

34. The system as claimed in claim 20, wherein each installation rig comprises a drilling unit operable to form a hole in a bed, and wherein each attachment pile is arranged to be displaced, during activation of the installation rigs; into a hole in the bed formed by the corresponding drilling unit, and wherein each attachment pile is hollow and the drilling unit is located within the attachment pile, the system further comprising:
a grout system for securing the attachment piles to the structure using grout supplied via the respective umbilical control cables;
grout manifolds adapted for installation on the structure before deployment thereof, the grout manifolds being adapted for distribution of grout supplied via the respective umbilical control cables; and
attachment members for attaching such grout manifolds to the structure prior to deployment of the structure from the floating installation vessel.

35. The system as claimed in claim 34, further comprising a quick-release coupling configured to allow the respective umbilical control cables to disconnect from the grout manifolds.

* * * * *